US009383080B1

(12) United States Patent
McGarvey et al.

(10) Patent No.: US 9,383,080 B1
(45) Date of Patent: Jul. 5, 2016

(54) WIDE FIELD OF VIEW CONCENTRATOR

(71) Applicant: National Security Agency, Ft. George G. Meade, MD (US)

(72) Inventors: Brian S. McGarvey, Arnold, MD (US); David J. Ortiz, Severna Park, MD (US); Mario A. Serna, Palmer Lake, CO (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 233 days.

(21) Appl. No.: 14/120,660

(22) Filed: May 21, 2014

(51) Int. Cl.
| | |
|---|---|
| H01L 31/18 | (2006.01) |
| F21V 7/06 | (2006.01) |
| F21V 13/04 | (2006.01) |
| F21V 5/04 | (2006.01) |
| G02B 26/02 | (2006.01) |
| G02B 27/40 | (2006.01) |

(52) U.S. Cl.
CPC . *F21V 7/06* (2013.01); *F21V 5/045* (2013.01); *F21V 13/04* (2013.01); *G02B 26/02* (2013.01); *G02B 27/40* (2013.01)

(58) Field of Classification Search
CPC ........... G02B 6/26; G02B 27/44; G01N 21/25
USPC .......................................................... 250/216
See application file for complete search history.

(56) References Cited

U.S. PATENT DOCUMENTS

| 6,516,116 | B1 | 2/2003 | Murray et al. | |
|---|---|---|---|---|
| 7,898,665 | B2 | 3/2011 | Brukilacchio et al. | |
| 8,354,628 | B2* | 1/2013 | Schmaelzle | F24J 2/065 126/684 |
| 8,987,658 | B2* | 3/2015 | Earman | H03K 17/941 250/216 |
| 2006/0126180 | A1* | 6/2006 | Jung | G11B 7/1353 359/565 |

* cited by examiner

*Primary Examiner* — Seung C Sohn

(57) ABSTRACT

The present invention is a system that offers a capability to concentrate light from a large focal point onto a small spot on a detector. The system also offers off-axis capability should the system be moved, poorly pointed, off axis or jostled while in use. As designed, the present invention includes a half-ball lens having a front end and a back end, a compound parabolic concentrator (CPC) having a front end and a back end, wherein the front end of said CPC is adjacent to the back end of the half-ball lens such that the CPC is centered against the back end of the half-ball lens, and a detector, wherein the detector is adjacent to the back end of the CPC.

12 Claims, 2 Drawing Sheets

WIDE FIELD OF VIEW CONCENTRATOR

FIELD OF INVENTION

The disclosure herein relates generally to optical coupling arrangements, and in particular to optical coupling arrangements suitable for use in high bandwidth, communications systems.

BACKGROUND OF THE INVENTION

One of the central problems associated with long distance Free Space Optics (FSO) is collecting enough signal at the detector to effectively receive data. Even if the correct wavelength of light is selected and the finest optics are used, light (even laser light) will disperse over distance due to a variety of factors including precipitation, temperature differentials, optical element stability, airborne particulates, off angle collection and effective steering. At great distances these factors have an even greater impact leading to dropped or corrupted data. This leads to a higher data error rate which is detrimental to high speed data transmissions. The invention in question when coupled with a Fresnel Lens significantly mitigates signal loss due to off angle collection, steering problems within stated parameters and by orders of magnitude improves the signal focus on the detector. While proper steering of the signal source and collection optics is key, the invention in question allows for relatively large imperfections in steering and still concentrates a great deal of dispersed signal onto the very small detector.

The prior art also includes the following patents and patent applications. U.S. Pat. No. 7,898,665, entitled "Light Emitting Diode Illumination System," discloses a system to generate a variety of high brightness light sources with varying emission spectra using light emitting diodes. Unlike the present invention, Bruldlacchio et al. discloses a method that incorporates the use of a compound parabolic concentrator (CPC) used to convert light emitted over a hemisphere while preserving the etendue and maximizing the brightness. The prior art also replacing the CPCs with imaging optics to maximize brightness of light emitted within the system. The prior art also discloses the use of a ball lens to reduce the angular extent of the light source, allowing for simpler optical collections into or onto the desired target areas. The present invention does not require such a specific setup, is not concerned with imaging optics and is not concerned or designed to improve localized brightness leaving the optical system in a medical situation like this endoscope. U.S. Pat. No. 7,898,665 is hereby incorporated by reference into the specification of the present invention.

U.S. Pat. No. 6,516,116, entitled "High Speed Optical Receiver," discloses a system designed to improve high-speed data rates. Unlike the present invention, Murray et al. discloses a receiver that attempts to improve the aperture size of a small detector. Unlike the present invention, Murray et al utilizes a focus lens that has a small f-number (f#) and requires the spot size of that light ($D_{DL}$) to be significantly smaller than the $D_{CPC}$ in order to put as much light onto the detector. However, the consequence of using a focusing lens with such a small f# is that the focal angle is much larger than the acceptance angle for much of the lens. Consequently, light rays largely pass through the CPC or bounce out through the entrance aperture. Thus only a small portion of the focused light actually hits the detector. In contrast, the present invention improves light collection and pointing by at least a factor of 25. U.S. Pat. No. 6,516,116 is hereby incorporated by reference into the specification of the present invention.

Unlike the existing prior art, the present invention funnels significant orders of magnitude more of the signal on the detector, allows for convergent and divergent light sources and ensures stable, high-speed data rates over a wider array of free space optical environments.

SUMMARY OF THE INVENTION

The object of the present invention is to offer a capability to concentrate light from a large focal point onto a small spot on a detector. Yet another object of the present invention is to offer off-axis capability should the system be moved, poorly pointed or jostled while in use. As designed, the present invention includes a half-ball lens having a front end and a back end, a compound parabolic concentrator (CPC) having a front end and a back end, wherein the front end of said CPC is adjacent to the back end of the half-ball lens such that the CPC is centered against the back end of the half-ball lens, and a detector, wherein the detector is adjacent to the back end of the CPC.

DETAILED DESCRIPTION

Figure 1:
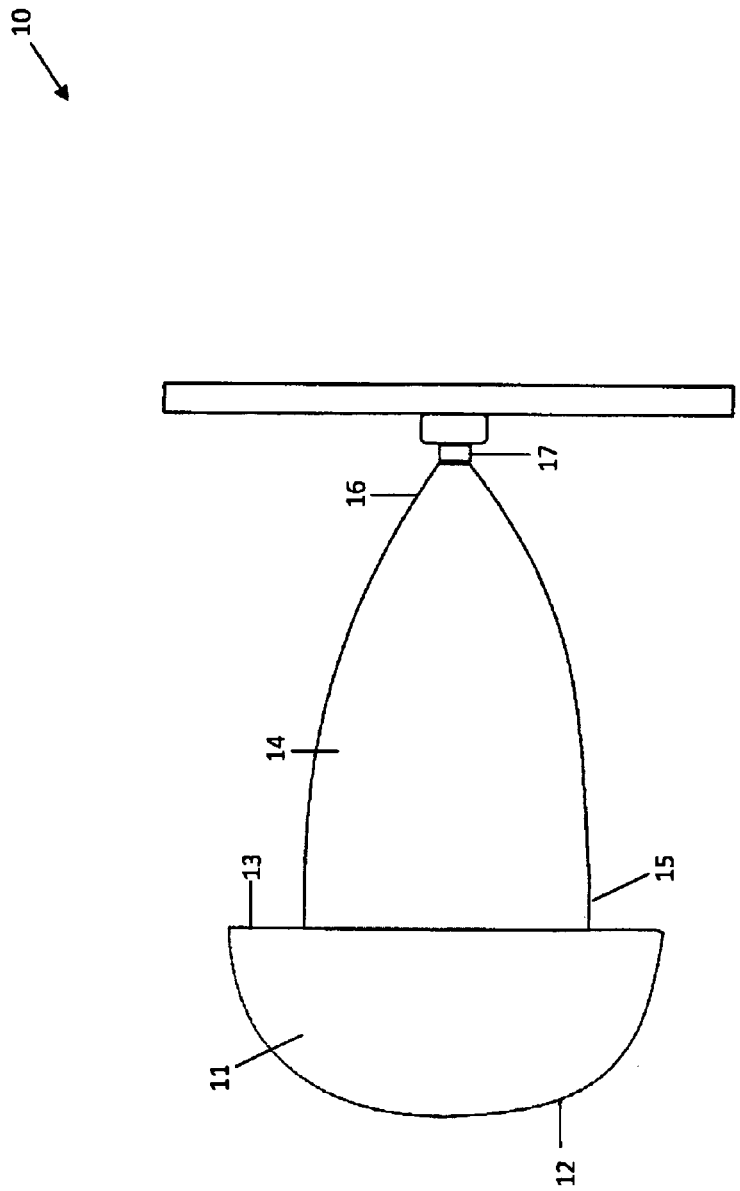
FIG. 1 discloses the present invention.
Figure 2:
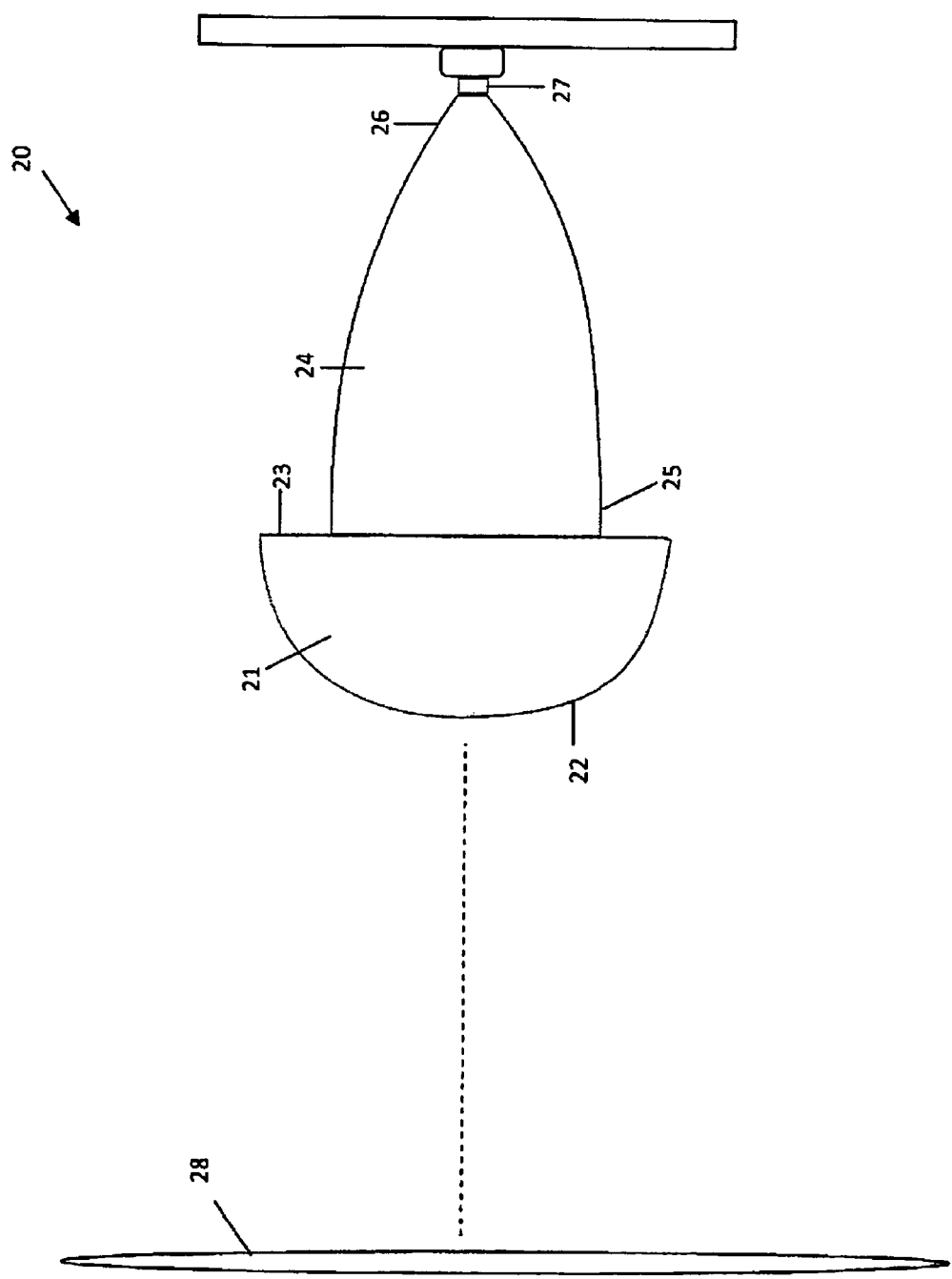
FIG. 2 discloses an alternate embodiment of the present invention.

The present invention discloses a device for concentrating the relatively larger focal point of a Fresnel lens eventually upon a point with the diameter of 0.5 mm. This dual lens system also allows for significant off-axis funneling and concentration of distant incoming light from any Fresnel lens or other light concentrators of relatively mediocre quality.

The system can be described in terms of a narrow field of view and wide field of view. In the first embodiment, the present invention encompasses a wide field of view. The system 10 includes a half-ball lens 11 having a front end 12, a back end 13, and a diameter of 6 mm. The device additionally includes a compound parabolic concentrator (CPC) 14 having a front end 15, a back end 16, a diameter of 4.6 mm, and an acceptance angle of 2Θa such that said acceptance angle ranges between six to seven degrees. The front end 15 of the CPC 14 is adjacent to the back end 13 of the half-ball lens 11 such that the CPC 14 is centered against the back end 13 of the half-ball lens 11. The half-ball lens 11 in its orientation and immediate proximity to the CPC 14 provides the CPC with a greater tolerance for incident light, thus greatly increasing its effective acceptance angle 2Θa. The device also includes a detector 17, wherein the detector 17 is adjacent to the back end of the CPC 14. Various detectors can be utilized including a high speed photo detector.

A second embodiment of the present invention encompasses a narrow field of view. The system 20 includes a half ball lens 21 having a front end 22 and a back end 23, having a diameter of 6 mm. It also includes a compound parabolic concentrator (CPC) 24 having a front end 25 and a back end 26, and a diameter of 4.6 mm and an acceptance angle of 2Θa such that said acceptance angle ranges between six to seven degrees. Here, the front end 25 of the CPC 24 is adjacent to the back end 23 of the half ball lens 21 such that the CPC 24 is centered against the back end 23 of the half ball lens 21. The present invention also includes a detector 27 wherein the detector 27 is adjacent to the back end 26 of the CPC 24. The system also includes a Fresnel lens 28. While there are various types of Fresnel lenses, the preferred embodiment utilizes a thin Fresnel lens with a thickness that ranges from ⅛ to ¼ inch and a diameter of at least 18 inches. Here, the Fresnel lens 28 is at some optimal distance from the front end 22 of the half-ball lens 21 based on its focal length such that light can be focused to a point in front of the half ball lens. Note that a light can be focused on the half ball lens or just in front of the half ball lens, whichever is better based on the Fresnel lens 28 selected, for optimal collimation into the CPC 24. This distance will be different based on the size and focal length of the selected Fresnel lens 28.

Accordingly, the light is focused at some angle, Φ, which is naturally greater than the CPC's 24 acceptance angle. The half-ball lens 21 then corrects for this greater angle Φ by collimating the light of the Fresnel lens 28 (which is divergent after the focal point) to a low acceptance angle (approaching 0 degrees) less than 2Θa. Thus light within the narrow field of view of the system is successfully concentrated on the detector 27 attached to the back end 26 of the CPC 24. Note that the Fresnel lens 28 is not drawn to scale because it is much larger than the half-ball lens 21 and the CPC 24. The dashed line represents some distance d between the half-ball lens 21 and the center of the Fresnel lens 28 that is based on the focal length of the Fresnel lens 28.

Note that using a Fresnel lens with different parameters, a standard imaging lens or a lens array to lead the optical plane before the half-ball lens may require the adjustment of a few parameters with the associated half-ball lens and the CPC to optimize light collection at the detector. It should then be understood that if a different focusing lens is used, the half-ball lens would have to be right-sized to ensure that the focused light from the new leading lens is properly captured and collimated below the acceptance angle of the CPC. Additionally, the distance of the half-ball lens and CPC pairing from the focal point of the leading lens would also have to be adjusted for maximum collection and collimation of light into the CPC. If the sizes of the other two lenses change, then the size of the CPC will likely have to change to optimize light collection from the half-ball. Although the present embodiments of the invention has been described in detail, it should be understood that a variety of modifications and substitutions such as those described above can be made therein without departing from the spirit and scope of the invention as defined by the claims.

What is claimed is:

1. A device comprising:
   a. a half-ball lens having a front end and a back end;
   b. a compound parabolic concentrator (CPC) having a front end and a back end, wherein said front end of said CPC is adjacent to said back end of said half-ball lens in immediate proximity such that said CPC is centered against said back end of said half-ball lens; and
   c. a high speed photo detector, wherein said high speed photo detector is adjacent to said back end of said CPC; wherein the half-ball lens is configured to collimate, into the CPC, light focused by a Fresnel lens and incident at the half-ball lens at an angle exceeding an acceptance angle of the CPC, such that the light collimated into the CPC is concentrated on the high speed photo detector.

2. The device of claim 1, wherein said half-ball lens has a diameter of 6 mm.

3. The device of claim 1, wherein said CPC has a diameter of 4.6 mm and the acceptance angle is between six and seven degrees.

4. The device of claim 2, wherein said CPC has a diameter of 4.6 mm and the acceptance angle is between six and seven degrees.

5. A device comprising:
   a. a half ball lens having a front end and a back end;
   b. a compound parabolic concentrator (CPC) having a front end and a back end, wherein said front end of said CPC is adjacent to said back end of said half ball lens in immediate proximity such that said CPC is centered against said back end of said half ball lens;
   c. a high speed photo detector, wherein said high speed photo detector is adjacent to said back end of said CPC; and
   d. a lens, wherein said lens is at a distance from the front end of the half-ball lens based on its focal length to the front end of said half-ball lens;
   wherein the half-ball lens is configured to collimate, into the CPC, light focused by the lens and incident at the half-ball lens at an angle exceeding an acceptance angle of the CPC, such that the light collimated into the CPC is concentrated on the high speed photo detector.

6. The device of claim 5, wherein said half ball lens has a diameter of 6 mm.

7. The device of claim 6, wherein said CPC has a diameter of 4.6 mm and the acceptance angle is between six and seven degrees.

8. The device of claim 5, wherein said CPC has a diameter of 4.6 mm and the acceptance angle is between six and seven degrees.

9. The device of claim 5, wherein said lens is a Fresnel lens.

10. The device of claim 9, wherein a thickness of said Fresnel lens is between ⅛ and ¼ inches.

11. The device of claim 10, wherein a diameter of said Fresnel lens is at least 18 inches.

12. The device of claim 9, wherein a diameter of said Fresnel lens is at least 18 inches.

* * * * *